(12) United States Patent
Jeong et al.

(10) Patent No.: US 8,862,669 B2
(45) Date of Patent: Oct. 14, 2014

(54) APPARATUS AND METHOD FOR IMPROVED ELECTRONIC MAIL

(75) Inventors: Wook-Hyun Jeong, Seoul (KR); Eun-Jung Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1197 days.

(21) Appl. No.: 11/443,691

(22) Filed: May 31, 2006

(65) Prior Publication Data

US 2007/0011257 A1  Jan. 11, 2007

(30) Foreign Application Priority Data

May 31, 2005  (KR) ........................ 10-2005-0046079

(51) Int. Cl.
*G06F 15/16* (2006.01)

(52) U.S. Cl.
USPC ............................ 709/206; 709/202; 709/203

(58) Field of Classification Search
USPC ......................................... 709/206, 202, 203
See application file for complete search history.

(56) References Cited

U.S. PATENT DOCUMENTS

| 5,742,668 | A | 4/1998 | Pepe et al. |
| 6,587,549 | B1 | 7/2003 | Weik |
| 6,895,426 | B1 | 5/2005 | Cortright et al. |
| 2002/0133557 | A1 | 9/2002 | Winarski |
| 2002/0137539 | A1* | 9/2002 | Takahashi et al. ............ 455/550 |
| 2003/0023443 | A1 | 1/2003 | Shizuka et al. |
| 2003/0233419 | A1* | 12/2003 | Beringer ........................ 709/206 |
| 2005/0234910 | A1* | 10/2005 | Buchheit et al. .................. 707/9 |
| 2006/0168038 | A1* | 7/2006 | Lin ................................ 709/206 |
| 2006/0179114 | A1* | 8/2006 | Deeds ........................... 709/206 |

FOREIGN PATENT DOCUMENTS

| CN | 1343417 | 4/2002 |
| CN | 1574865 | 2/2005 |
| JP | 2001-265672 | 9/2001 |
| JP | 2002-024136 | 1/2002 |
| JP | 2005-005831 | 1/2005 |
| KR | 10-2002-0060386 | 7/2002 |
| WO | WO 00/54487 | 9/2000 |

* cited by examiner

*Primary Examiner* — Nicholas Taylor
(74) *Attorney, Agent, or Firm* — The Farrell Law Firm, P.C.

(57) ABSTRACT

An E-mail apparatus and method are provided. The e-mail apparatus includes a memory that stores display names and e-mail addresses corresponding to the display names, and a controller that extracts an e-mail address from a received e-mail message, retrieves from the memory a display name corresponding to the extracted e-mail address, modifies the display name of the received e-mail message to the retrieved display name, and outputs the modified display name.

17 Claims, 3 Drawing Sheets

APPARATUS AND METHOD FOR IMPROVED ELECTRONIC MAIL

PRIORITY

This application claims priority under 35 U.S.C. §119 to an application entitled "Apparatus and Method for Improved Electronic Mail" filed in the Korean Intellectual Property Office on May 31, 2005 and assigned Serial No. 2005-46079, the contents of which are incorporated herein by reference.

BACKGROUND OF THE INVENTION

1. Field of the Invention

The present invention relates to an apparatus and method for improved electronic mail, and more particularly, to an apparatus and method for improved electronic mail in which the e-mail apparatus includes a memory for storing display names and e-mail addresses corresponding to the display names, and a controller for extracting an e-mail address from a received E-mail message, retrieving a display name corresponding to the extracted e-mail address from the memory, modifying the display name of the received e-mail message into the retrieved display name, and outputting the modified display name. Portable telecommunication terminal may include the apparatus and method for improved electronic mail.

2. Description of the Related Art

The development of the Internet has allowed people to be able to promptly and conveniently send and receive information via e-mail. Similar to conventional mail, the e-mail message has a sender's address and a recipient's address. Such information is sent while being stored in an e-mail header. The header of the e-mail message includes information such as address fields of a sender ("from"), a reply recipient ("reply-to"), a recipient ("to"), a carbon copy (cc) recipient and a blind carbon copy (bcc) recipient. The e-mail sender provides the e-mail address or display name for each address field according to objects. The sender can directly input a recipient's e-mail address through an edit window, such that the recipient's e-mail address is included in the e-mail header. In this case, since the sender does not designate a specific display name, the e-mail address itself becomes the display name and is stored in the e-mail header.

However, if an e-mail client or e-mail server supports an address book function, the sender can store the information of the recipient's display name and e-mail address in the address book. Also, when the sender inputs the recipient's display name in the edit window, the e-mail client links it to data of the address book and extracts the corresponding e-mail address, and then automatically adds the extracted e-mail address to the e-mail header. At this point, the address field of the e-mail header is constructed in a form of the display name and the actual e-mail address.

This address inputting/displaying method is convenient for the sender. As to the recipient, however, the display name is extracted from the address field of the received e-mail header and then displayed for the recipient. Therefore, when the recipient and the sender store different display names in their address books with respect to the same e-mail address, the recipient sees the display name created based on the sender's address book.

While the existing e-mail service provides the function of linking the e-mail address to the address book when composing the e-mail message, it does not provide that function when receiving the e-mail message. This is an inconvenience to the recipient.

The display name provides a meaningful character sequence for the user's convenience. However, as to the recipient, the display name created based on the sender's address book is not meaningful and is unnecessary information. In this manner, the conventional e-mail service is convenient for the sender, but is inconvenient for the recipient.

SUMMARY OF THE INVENTION

The present invention provides an e-mail apparatus and method for retrieving a received e-mail address from a recipient's address book and displaying a display name and address designated by the recipient.

Also, the present invention provides an e-mail apparatus and method for retrieving a received e-mail address from a recipient's address book and displaying a group name and address designated by the recipient.

Further, the present invention provides an e-mail apparatus and method for retrieving a received e-mail address from a recipient's address book and storing the received e-mail message based on a group designated by the user.

According to the present invention, there is provided an e-mail apparatus including a memory for storing display names and e-mail addresses corresponding to the display names, and a controller for extracting an e-mail address from a received e-mail message, retrieving from the memory a display name corresponding to the extracted e-mail address, modifying the display name of the received e-mail message to the retrieved display name, and outputting the modified display name.

According to the present invention, there is provided a method of displaying an address in an e-mail apparatus, including determining whether a received e-mail address is contained in an address book, and if the received e-mail address is contained in the address book, extracting a display name corresponding to the received e-mail address from the address book, and modifying a display name of the received e-mail to the extracted display name.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. A detailed description of well-known features will be omitted for the sake of clarity and conciseness.

Figure 1:
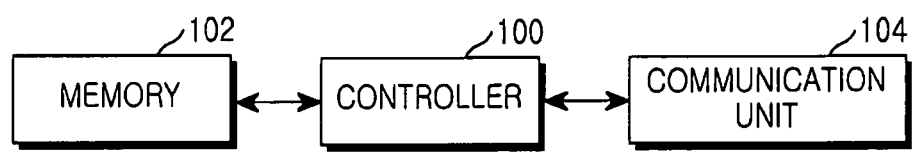
FIG. 1 is a block diagram of an e-mail apparatus for displaying an e-mail address by retrieving the address from a recipient's address book according to the present invention.

FIG. 1 is a block diagram of an e-mail apparatus for displaying an e-mail address by retrieving the address from a recipient's address book according to the present invention.

The e-mail address extracted from a received e-mail message includes a sender's address, a recipient's address, a carbon copy (cc) recipient's address and a blind carbon copy (bcc) recipient's address.

Referring to FIG. 1, the e-mail apparatus of the present invention includes a controller 100, a memory 102 and a communication unit 104. The controller 100 controls an overall operation of the e-mail apparatus. In addition, the controller 100 extracts an address from a received e-mail header and retrieves the extracted address from an address book stored in the memory 102. If the extracted address is contained in the address book, the controller 100 extracts a display name and a group name stored in the address book. Then, the controller 100 modifies the contents of the e-mail header and outputs the modified contents.

The memory 102 temporarily stores a program for controlling the overall operation and data generated during operations. Also, the memory 102 stores the address book containing such information as the display name, the group name and the e-mail address.

Figure 2:
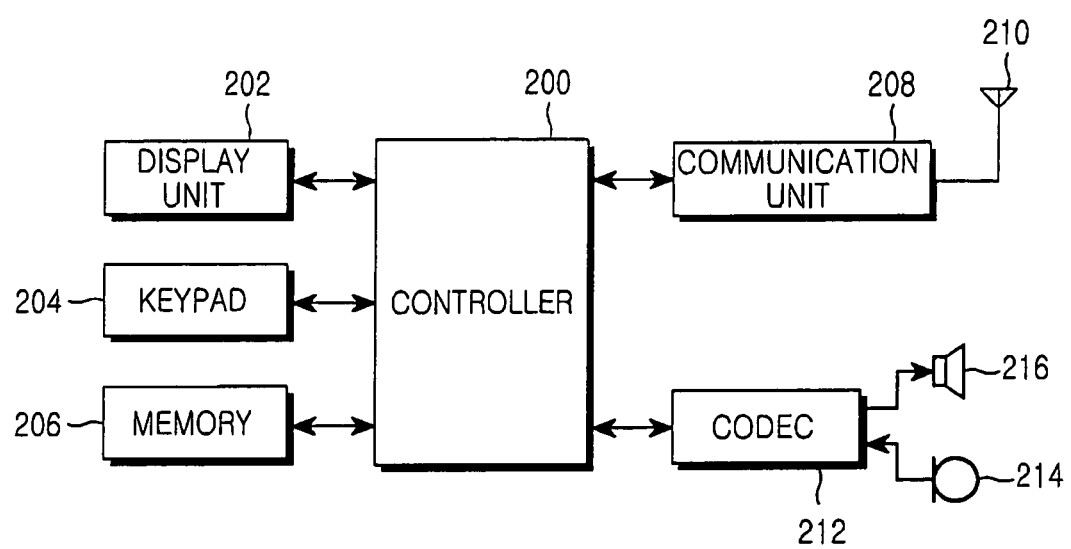
FIG. 2 is a block diagram of a portable telecommunication terminal for displaying an E-mail address by retrieving the address from a recipient's address book according to the present invention.

The communication unit 104 sends or receives the e-mail message via a wired or wireless network. The e-mail apparatus of the present invention is an e-mail server or an e-mail client for receiving an e-mail message. Examples of the e-mail client include a personal computer and a portable telecommunication terminal. FIG. 2 is a block diagram is a block diagram of a portable telecommunication terminal for displaying an e-mail address by retrieving the address from a recipient's address book according to the present invention.

Referring to FIG. 2, the portable telecommunication terminal that measures a reference slope includes a controller 200, a display unit 202, a keypad 204, a memory 206, a communication unit 208, an antenna 210, a coder-decoder (codec) 212, a microphone 214 and a speaker 216.

The controller 200 controls an overall operation of the portable telecommunication terminal. For example, the controller 200 processes and controls a voice communication and a data communication, and extracts an address from a received e-mail header and retrieves the extracted address from an address book stored in the memory 206. If the extracted address is contained in the address book, the controller 200 extracts a display name and a group name stored in the address book. Then, the controller 100 modifies the contents of the e-mail header and outputs the modified contents. The display unit 202 displays status information (or indicator) generated during operations, such as numerals and characters, moving pictures and still pictures. A color liquid crystal display (LCD) may be used for the display unit 202.

The keypad 204 includes numeric keys of digits 0-9 and a plurality of function keys, such as a Menu key, a Cancel (Delete) key, a Conformation key, a Talk key, an End key, an Internet connection key and Navigation keys (▲/▼/◄/►). In addition to the general functions, the keypad 204 further includes a slope measuring button such that a key input data corresponding to a key pressed by the user is transferred to the controller 200.

The memory 206 stores a program for controlling an overall operation of the portable telecommunication terminal. Also, the memory 206 temporarily stores data generated during operations and complementary data (e.g., telephone number, SMS message and picture data). In addition to the general functions, the memory 206 stores an address books containing a display name, a group name, and an e-mail address.

Upon a reception operation, the communication unit 208 performs a despreading and a channel decoding of a received signal by down-converting a frequency of an RF signal received through the antenna 210. Upon a transmission operation, the communication unit 208 performs a channel coding and a spreading of data, up-converts a frequency of the channel-coded and spread data, and transmits it through the antenna 210. Also, the communication unit 208 receives an identification number of a base station through a pilot channel. Further, the communication unit 208 transmits or receives an e-mail address.

The codec 212, microphone 214 and the speaker 216 connected to the codec 212 serve as an audio input/output block for a voice communication. The controller 200 produces PCM data and the codec 212 converts the PCM data into analog audio signals. The analog audio signals are outputted through the speaker 216. Also, the codec 212 converts audio signals received through the microphone 214 into PCM data and provides the PCM data to the controller 200.

Figure 3:
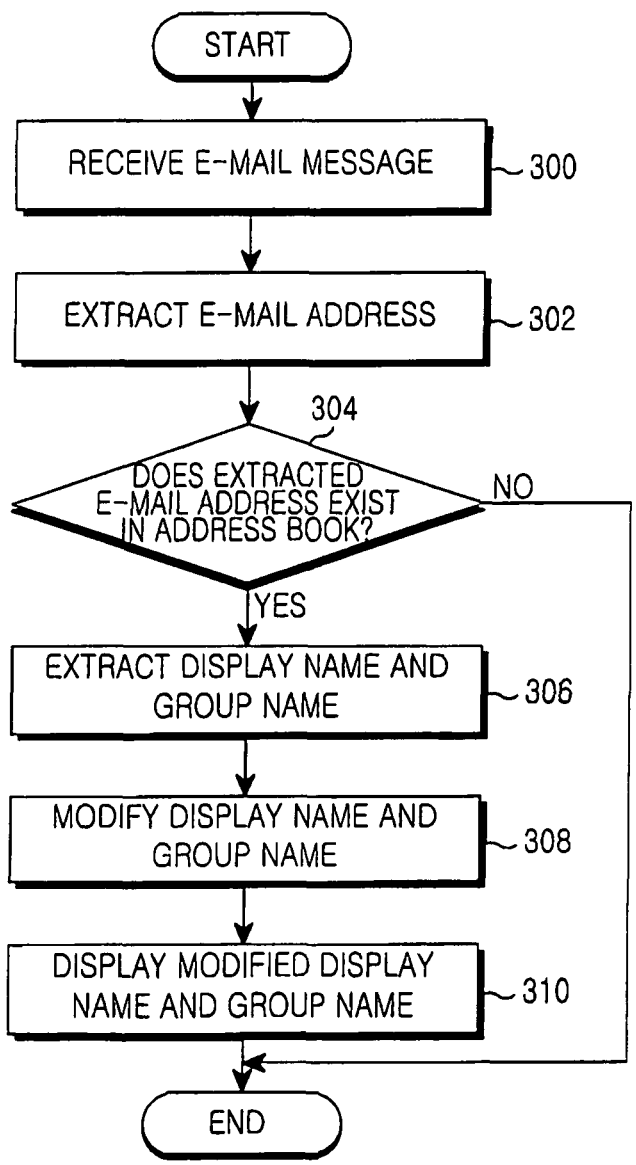
FIG. 3 is a flowchart illustrating a method of displaying an e-mail address by retrieving the address from a recipient's address book according to the present invention.

FIG. 3 is a flowchart illustrating a method of displaying an e-mail address by retrieving the address from a recipient's address book according to the present invention.

In operations 300 and 302, when an e-mail message is received, an e-mail address is extracted from a header of the received e-mail message.

In operation 304, it is determined whether the received e-mail address is contained in the address book by retrieving the extracted E-mail address from the address book stored in the memory.

If the received e-mail address is not contained in the address book, the process is terminated. On the contrary, in operation 306, if the received e-mail address is contained in the address book, a display name and a group name corresponding to the received e-mail address is extracted from the address book.

In operation 308, the header contents of the received e-mail message are converted or modified into the extracted display name and group name.

In operation 310, the received e-mail address is displayed with the converted or modified display name and group name.

According to the present invention, the group name as well as the display name is stored in the header of the received e-mail message. Therefore, when the recipient checks the received e-mail message, the display name and the group name designated to the recipient's address book can be displayed. Also, the received e-mails can be managed based on the groups.

According to the present invention, the e-mail apparatus includes a memory for storing display names and e-mail addresses corresponding to the display names, and a controller for extracting an e-mail address from a received e-mail message, retrieving a display name corresponding to the extracted e-mail address from the memory, modifying the display name of the received e-mail message into the retrieved display name, and outputting the modified display name. Therefore, the display name of the e-mail address is modified and displayed based on the recipient's address book, the group name is added, and the e-mail message is managed based on the group, thereby providing convenience to the e-mail user.

The foregoing embodiments are merely preferred and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A communication device comprising:
an address book for storing display names, group names, and e-mail addresses corresponding to the display names; and a controller for:
extracting an e-mail address from a received e-mail message,
retrieving, from the address book, a display name corresponding to the extracted e-mail address
comparing the retrieved display name to a sender name of the e-mail message,
determining whether a difference exists between the sender name of the received e-mail message and a display name in the address book corresponding to the extracted e-mail address,
outputting, when the sender name of the received e-mail message differs from the display name in the address book corresponding to the extracted e-mail address, the retrieved display name for display as the sender name of the received e-mail message, based on the display name in the address book,
retrieving a group name corresponding to the extracted e-mail address, and
adding the retrieved group name to the received e-mail message,
wherein outputting the retrieved display name is based on retrieving from the address book the display name corresponding to the extracted e-mail address, and the retrieved group name is displayed with the retrieved display name.

2. The communication device of claim 1, wherein the group names categorize the e-mail addresses.

3. The communication device of claim 1, wherein the controller stores the received e-mail message based on the retrieved group name.

4. The communication device of claim 1, further comprising replacing the sender name of the e-mail message with the retrieved display name, when the sender name of the e-mail message is not identical to the retrieved display name.

5. A communication device comprising:
a memory for storing display names, group names, and e-mail addresses corresponding to the display names;
a controller for:
extracting an e-mail address from a received e-mail message,
determining whether the e-mail address is stored in the memory,
retrieving, from the memory, a display name corresponding to the extracted e-mail address, when the e-mail address is stored in the memory,
replacing a sender name of the received e-mail message with the retrieved display name,
retrieving a group name corresponding to the extracted e-mail address, and
adding the retrieved group name to the received e-mail message; and
a display for displaying the display name that replaced the sender name with a body of the received e-mail message with the retrieved group name.

6. The communication device of claim 5, wherein the group names categorize the e-mail addresses.

7. The communication device of claim 4, wherein the controller stores the received e-mail message based on the retrieved group name.

8. The communication device of claim 5, wherein the e-mail address is stored in an address book in the memory.

9. A method of displaying an e-mail message in a communication device including a memory that stores display names and e-mail addresses corresponding to the display names, the method comprising:
receiving an e-mail message;
extracting an e-mail address from the received e-mail message;
retrieving, from the memory, a display name corresponding to the extracted e-mail address;
outputting the retrieved display name to be displayed as a sender name of the received e-mail message based on when a difference exists between the sender name of the received e-mail message and the display name in the memory corresponding to the extracted e-mail address;
retrieving a group name corresponding to the extracted e-mail address, and
adding the retrieved group name to the received e-mail message,
wherein outputting the retrieved display name is based on retrieving from the memory the display name corresponding to the extracted e-mail address, and
wherein the retrieved group name is displayed with the retrieved display name.

10. The method of claim 9, wherein the group names categorize the e-mail addresses.

11. The method of claim 9, further comprising storing the e-mail message based on the retrieved group name.

12. The method of claim 9, further comprising replacing the sender name of the e-mail message with the retrieved display name, when the sender name is not identical to the retrieved display name.

13. A method of displaying an e-mail message in a communication device including a memory that stores display names and e-mail addresses corresponding to the stored display names, the method comprising:
receiving an e-mail message;
extracting an e-mail address from the received e-mail message;
determining whether the extracted e-mail address is stored in the memory;
retrieving, from the memory, a display name corresponding to the extracted e-mail address, when the extracted e-mail address is stored in the memory;
replacing a sender name of the received e-mail message with the retrieved display name;
retrieving a group name corresponding to the extracted e-mail address;
adding the retrieved group name to the e-mail message; and
displaying the display name that replaced the sender name and the retrieved group name with a body of the received e-mail message.

14. The method of claim 13, wherein the group names categorize the e-mail addresses.

15. The method of claim 13, further comprising storing the e-mail message based on the retrieved group name.

16. The method of claim 13, further comprising displaying the e-mail message with the sender name of the e-mail message, when the e-mail address is not stored in the memory.

17. The method of claim 13, wherein the e-mail address is stored in an address book in the memory.

* * * * *